United States Patent
Markham et al.

(10) Patent No.: US 11,594,343 B2
(45) Date of Patent: Feb. 28, 2023

(54) METHOD AND DEVICE FOR REPLACING SLEEVES LINING NUCLEAR REACTOR PRESSURE VESSEL TUBES

(71) Applicant: Framatome Inc., Lynchburg, VA (US)

(72) Inventors: Wade Markham, Forest, VA (US); Ryan Melcher, Evington, VA (US)

(73) Assignee: Framatome Inc., Lynchburg, VA (US)

( * ) Notice: Subject to any disclaimer, the term of this patent is extended or adjusted under 35 U.S.C. 154(b) by 200 days.

(21) Appl. No.: 17/046,607

(22) PCT Filed: Apr. 13, 2018

(86) PCT No.: PCT/US2018/027668
§ 371 (c)(1),
(2) Date: Oct. 9, 2020

(87) PCT Pub. No.: WO2019/199336
PCT Pub. Date: Oct. 17, 2019

(65) Prior Publication Data
US 2021/0125739 A1 Apr. 29, 2021

(51) Int. Cl.
G21C 17/017 (2006.01)
G21C 7/10 (2006.01)
G21C 13/036 (2006.01)
G21C 19/20 (2006.01)

(52) U.S. Cl.
CPC ............. G21C 17/017 (2013.01); G21C 7/10 (2013.01); G21C 13/036 (2013.01); G21C 19/207 (2013.01)

(58) Field of Classification Search
CPC ...... G21C 17/017; G21C 7/10; G21C 13/036; G21C 19/207

USPC .................................................. 376/291, 353
See application file for complete search history.

(56) References Cited

U.S. PATENT DOCUMENTS

| | | |
|---|---|---|
| 3,941,653 A | 3/1976 | Thorp, II |
| 4,637,914 A | 1/1987 | Boyle et al. |
| 5,297,187 A | 3/1994 | Sodergren et al. |
| 5,396,800 A | 3/1995 | Drinon et al. |
| 5,404,382 A | 4/1995 | Russ et al. |
| 5,605,361 A | 2/1997 | Sims |
| 5,918,911 A | 7/1999 | Sims |
| 2019/0252082 A1 | 8/2019 | Benacquista et al. |
| 2021/0158980 A1* | 5/2021 | Benacquista ........ G21C 19/207 |

FOREIGN PATENT DOCUMENTS

| | | |
|---|---|---|
| FR | 2689297 A1 | 10/1993 |
| FR | 2701785 A1 | 8/1994 |
| WO | WO2019/156865 A1 | 8/2019 |

OTHER PUBLICATIONS

Search Report from corresponding PCT/US2018/027668.

* cited by examiner

*Primary Examiner* — Jack W Keith
*Assistant Examiner* — Daniel Wasil
(74) *Attorney, Agent, or Firm* — Davidson, Davidson & Kappel, LLC

(57) ABSTRACT

A method for restraining a sleeve lining a tube passing through a nuclear reactor pressure vessel is provided. The method includes attaching in situ a radial protrusion on an external surface of the sleeve; and attaching a collar to an end of the tube and coupling the radial protrusion with the collar to retain the thermal sleeve in position.

18 Claims, 3 Drawing Sheets

METHOD AND DEVICE FOR REPLACING SLEEVES LINING NUCLEAR REACTOR PRESSURE VESSEL TUBES

The present disclosure generally involves a method and device for replacing a sleeve lining a tube passing through a nuclear reactor pressure vessel and more specifically to a method and device for replacing a thermal sleeve lining a control rod drive mechanism (CRDM) nozzle or housing.

BACKGROUND

Reactor vessel closure heads (RVCH), for example in Westinghouse reactors, have thermal sleeves, whose main function is to shield the CRDM nozzle form thermal shock when the hot control rod drive is withdrawn from the core. The thermal sleeves over time wear due to vibration and eventually fail. Conventionally, RVCH is removed from the vessel and placed on a head stand, then the CRDM is fully removed and the thermal sleeve is replaced.

FR 2689297 discloses a tool designed to allow the sleeve replacement without removing the CRD, which involves using a replacement sleeve that comprises an outer flange constituting a bearing portion for a fastening nut of the replacement sleeve.

SUMMARY OF THE INVENTION

A method for replacing a sleeve lining a tube passing through a nuclear reactor pressure vessel is provided. The sleeve has an end including a radially enlarged end portion configured for resting on a support section of the tube for retaining the sleeve in the tube. The method including removing the sleeve from the tube; providing a new sleeve with a radially variable end configured for being moved between a radially contracted configuration and a radially expanded configuration; and installing the new sleeve in the tube such that the radially variable end is received by the support section and the radially variable end retains the new sleeve in the tube. The radially variable end is in the radially contracted configuration during installation and is in the radially expanded configuration after the new sleeve is installed in the tube.

Embodiments of the method may include one or more of the following features:

the installing of the new sleeve includes inserting the radially variable end in the radially contracted configuration in a first end of the tube, the radially variable end being in the radially expanded configuration in a second end of the tube after installation; the first end of the tube is a lower end of the tube and the second end of the tube is an upper end of the tube; the radially variable end includes a plurality of circumferentially spaced segments that are flexible radially inward and radially outward;

each of the circumferentially spaced segments includes a radially outward protrusion resting on the support section after the new sleeve is installed in the tube;

the new sleeve includes a first end, a second end and an intermediate portion extending from the first end to the second end, the first end being the radially variable end, the radially outward protrusions extending radially outward past an outer circumferential surface of the intermediate portion;

each of the segments includes a base end at the intermediate portion and a longitudinally extending prong extending axially from the base end to the radially outward protrusion;

the new sleeve includes a funnel at an end thereof that is opposite of the radially variable end, the funnel being part of the new sleeve during the installing of the new sleeve in the tube;

the installing of the new sleeve in the tube includes, after the radially variable end is received by the support section, mounting a retainer on the radially variable end to restrain the radially variable end in the radially expanded configuration;

the tube is passing through a closure head of the nuclear reactor pressure vessel, the closure head being separated from a cylindrical shell of the nuclear reactor pressure vessel during the installing of the new sleeve in the tube;

the tube is a control rod drive mechanism nozzle and the sleeve is a thermal sleeve;

the radially variable end includes a plurality of circumferentially spaced segments that are flexible radially inward and radially outward, each of the circumferentially spaced segments including a longitudinally extending prong and a radially outward protrusion on an upper end of the prong, each radially outward protrusion extending radially outward past and outer circumferential surface of the respective prong;

the installing of the new sleeve includes forcing the radially outward protrusions radially inward to orient the radially variable end in the radially contracted configuration and inserting the radially variable end in a lower end of the tube while the radially variable end is in the radially contracted configuration;

the installing of the new sleeve further includes moving the radially variable end upward through an intermediate portion of the tube while the radially variable end is in the radially contracted configuration until the radially variable end reaches the support section, the support section having a larger diameter than the intermediate portion of the tube, the protrusions expanding radially outward when the radially variable end reaches the support section to orient the radially variable end in the radially expanded configuration.

A control rod drive mechanism thermal sleeve for insertion into a control rod drive mechanism nozzle of a nuclear reactor pressure vessel is also provided. The control rod drive mechanism thermal sleeve includes a radially variable end configured for being moved between a radially contracted configuration and a radially expanded configuration. The radially variable end is configured for retaining the new sleeve in the tube in the radially expanded configuration. The control rod drive mechanism thermal sleeve also includes a further end opposite of the radially variable end, the further end including a funnel having a frustoconical portion having a maximum diameter edge defining an end edge of the further end.

Embodiments of the control rod drive mechanism thermal sleeve may include one or more of the following features:

the radially variable end includes a plurality of circumferentially spaced segments that are flexible radially inward and radially outward;

each of the circumferentially spaced segments includes a radially outward protrusion configured for retaining the control rod drive mechanism thermal sleeve in the control rod drive mechanism nozzle;

an intermediate portion extending from the radially variable end to the further end, the radially outward protrusions extending radially outward past an outer circumferential surface of the intermediate portion;

each of the segments includes a base end at the intermediate portion and a longitudinally extending prong extending axially from the base end to the radially outward protrusion;

a retainer mounted on the radially variable end to restrain the radially variable end in the radially expanded configuration.

BRIEF DESCRIPTION OF THE DRAWINGS

The present invention is described below by reference to the following drawings, in which.

DETAILED DESCRIPTION

The present disclosure provides a replacement thermal sleeve and a method of replacing a thermal sleeve in a nuclear reactor pressure vessel by lock the replacement thermal sleeve in position in a CRDM nozzle through radial expansion cooperating with the upper end of the nozzle. The top replacement thermal sleeve is compressed and inserted into the bottom of the nozzle, then pushed upward to its final location with an installation tool. Once in positon at a top end of the nozzle, the top of the replacement sleeve is uncompressed thus expanding to hold itself in place. At this point, the installation tool is used to pull the support ring down, locking the thermal sleeve in place.

Figure 1:
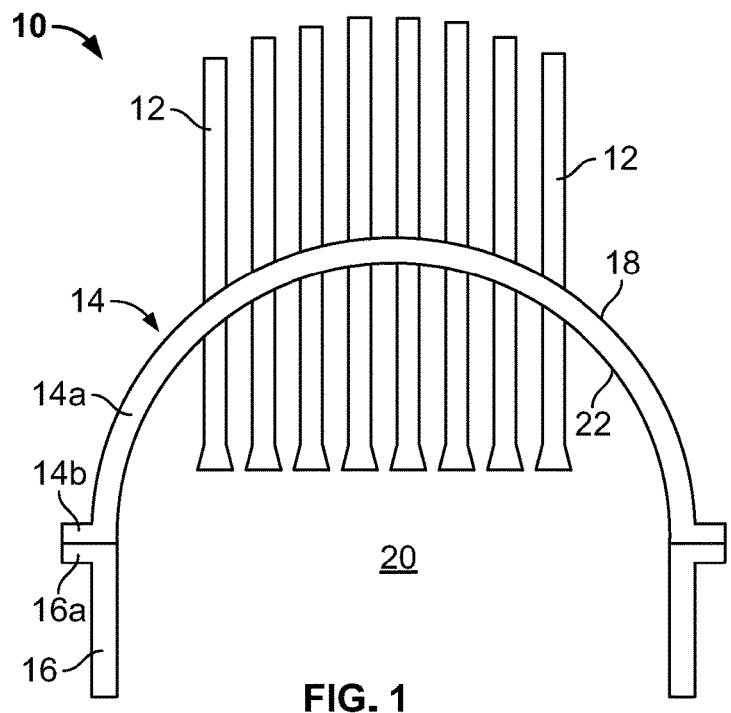
FIG. 1 schematically shows a cross-sectional view of a nuclear reactor pressure vessel of a PWR including a plurality of CRDM tube assemblies extending upward from the pressure vessel.

FIG. 1 schematically shows a cross-sectional view of a nuclear reactor pressure vessel 10 of a pressurized water reactor (PWR) including a plurality of CRDM tube assemblies 12 extending upward from pressure vessel 10. Pressure vessel 10 includes a RVCH 14 including a hemispherical wall 14a positioned atop a flange 14b, with CRDM tube assemblies 12 passing through hemispherical wall 14a. RVCH 14 is removable fixed on top of a cylindrical shell 16 via flange 14b of RVCH 14 being fixed to a flange 16a of cylindrical shell 16 by studs and nuts. Hemispherical wall 14a includes an exterior hemispherical surface 18 facing away from an interior 20 of pressure vessel 10 and an interior hemispherical surface 22 facing toward interior 20. CRDM tube assemblies 12 extend through both exterior hemispherical surface 18 and interior hemispherical surface 22. During operation of the nuclear reactor, RVCH 14 is fixed on top of a cylindrical shell 16. During refueling operations, RVCH 14 is removed from cylindrical shell 16.

Figure 2A:
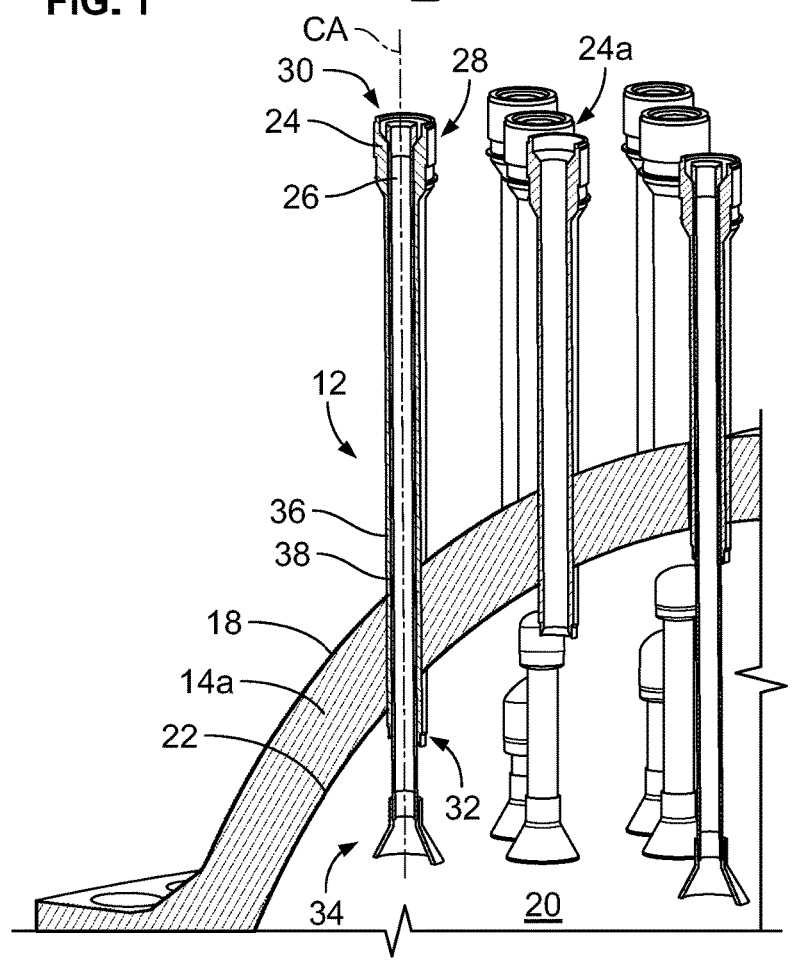
FIG. 2a shows a partial perspective cross-sectional view of a closure head of the nuclear reactor pressure vessel illustrating the detail of the nozzles and thermal sleeves of CRDM tube assemblies shown in FIG. 1.

FIG. 2a shows a partial perspective cross-sectional view of RVCH 14 illustrating the details of CRDM tube assemblies 12. Each of CRDM tube assemblies 12 includes an outer tube in the form of a nozzle 24 permanently fixed in wall 14a and a thermal sleeve 26 lining nozzle 24. One nozzle 24a is shown in FIG. 2a without a sleeve 26 fixed therein. Each of nozzles 24 passes through a corresponding hole formed in wall 14a and is welded to wall 14a.

Each of CRDM tube assemblies 12 is positioned such that a respective center longitudinally extending axis CA of the CRDM tube assembly 12 extends vertically through wall 14a. The terms axially, radially and circumferentially as used herein are used with respect to center axis CA for the respective CRDM tube assembly 12. CRDM tube assemblies 12 protrude longitudinally past hemispherical surface 18 such that a first end 28 of nozzle 24 and a first end 30 of sleeve 26 are positioned outside of pressure vessel 10. CRDM tube assemblies 12 also protrude longitudinally past hemispherical surface 22 such that a second end 32 of nozzle 24 and a second end 34 of sleeve 26 are positioned in interior 20 of pressure vessel 10. Nozzle 24 includes an intermediate portion 36 extending from first end 28 to second end 32 through wall 14a and sleeve 26 includes an intermediate portion 38 extending from first end 30 to second end 34 through wall 14a.

Figure 2B:
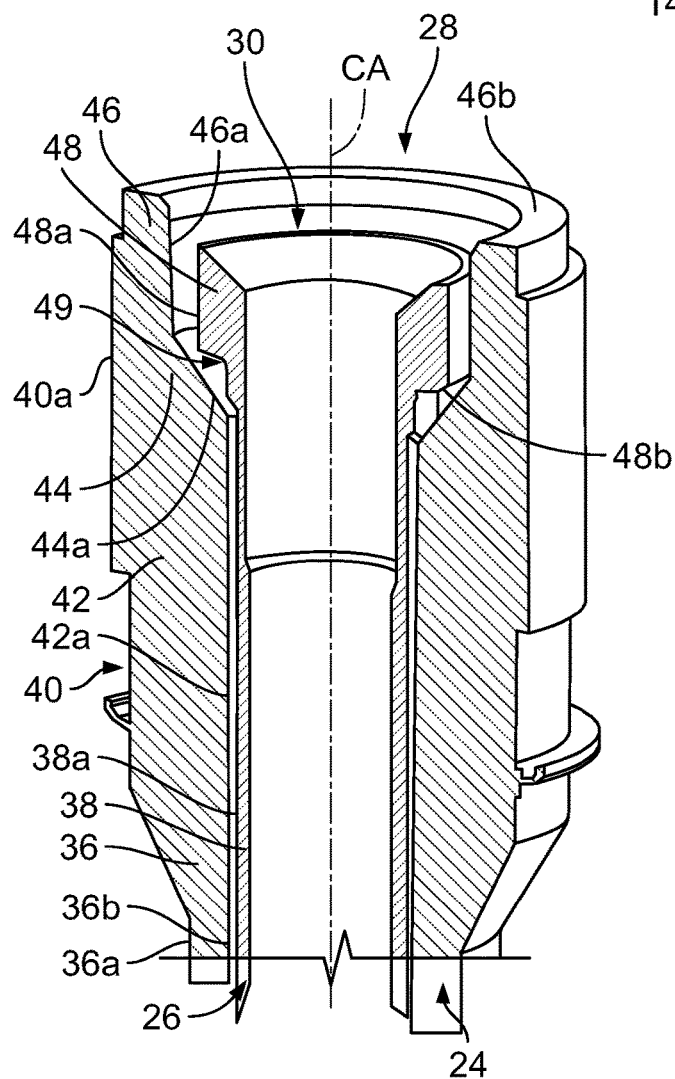
FIG. 2b shows an enlarged view of an upper end of one of the nozzles and an upper end of the thermal sleeve received in the nozzle.

FIG. 2b shows an enlarged view of first end 28 of nozzle 24 and first end 30 of sleeve 26. First end 28 of nozzle 24 extends vertically upward further than first end 30 of sleeve 26 away from wall 14a (FIG. 2a). First end 28 of nozzle 24 includes a radially enlarged annular portion 40 that is radially thicker than intermediate portion 36 of nozzle 24 and has an outer circumferential surface 40a that is radially further away from center axis CA than an outer circumferential surface 36a of intermediate portion 36. Radially enlarged annular portion 40 includes a lower section 42 having an inner circumferential surface 42a of a same diameter as an inner circumferential surface 36b of intermediate portion 36. Above lower section 42, an inner diameter of enlarged annular portion 40 defines a radially enlarged support section 44 formed as an annular shoulder having a frustoconical inner circumferential support surface 44a extending radially away from inner circumferential surface 42a while extending axially upward to join an inner circumferential surface 46a of an upper section 46 of enlarged annular portion 40. Upper section 46 defines a top edge 46b of nozzle 24.

First end 30 of sleeve 26 includes a radially enlarged annular portion 48 that is radially thicker than intermediate portion 38 of thermal sleeve 26 and has an outer circumferential surface 48a that is radially further away from center axis CA than an outer circumferential 38a of intermediate portion 38. Radially enlarged annular portion 48 is supported by support section 44 of radially enlarged annular portion 40 of nozzle 24. More specifically, radially enlarged annular portion 48 includes a lower surface 48b that rests vertically on support surface 44a. Lower surface 48b includes an annular groove 49 formed therein. Over time, due to vibrations experienced by thermal sleeve 26, failure can occur at radially enlarged portion 48.

Figure 2C:
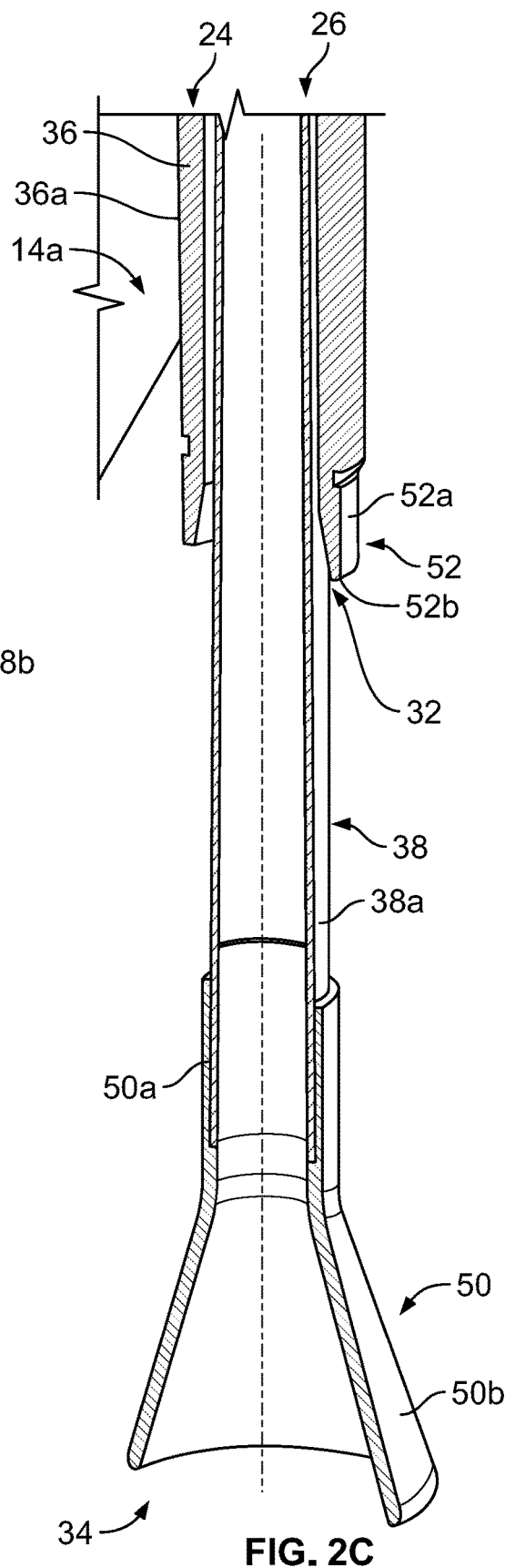
FIG. 2c shows an enlarged view of a lower end of one of the nozzles and a lower thermal sleeve received in the nozzle.

FIG. 2c shows an enlarged view of second end 32 of nozzle 24 and second end 34 of sleeve 26. Second end 34 of sleeve 26 extends vertically downward further than second end 32 of nozzle 24 away from wall 14a. Second end of sleeve 26 is formed by a funnel 50 that is fixed to intermediate portion 38. Funnel 50 includes a cylindrical section 50a this is fixed to outer circumferential surface 38a of intermediate portion and a frustoconical section 50a extending downward from cylindrical section 50a. Frustoconical section 50b enlarges radially as it extends downward vertically away from intermediate portion 38. Second end 32 of nozzle 24 is substantially cylindrically shaped and surrounds a section of intermediate portion 38 of sleeve 26.

Figure 3:
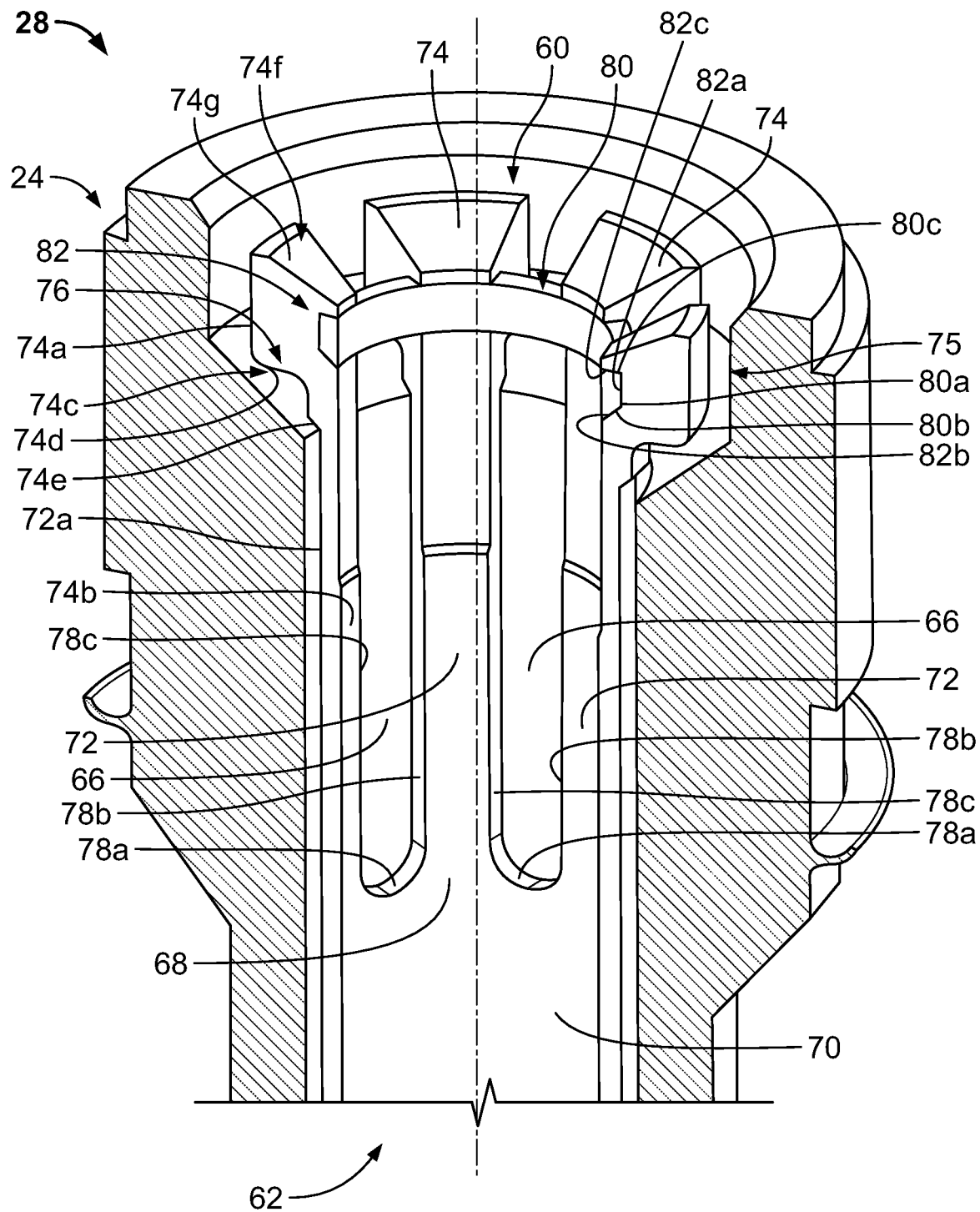
FIG. 3 shows an enlarged view of an upper end of a thermal sleeve in accordance with an embodiment of the present invention.

FIG. 3 shows an upper end 60 of a new or replacement thermal sleeve 62 in accordance with an embodiment of the present invention fixed in place in nozzle 24. Besides from the differences between upper end 60 of thermal sleeve 62 and upper end 28 of thermal sleeve 26, thermal sleeve 62 is configured in the same manner as original thermal sleeve 26. Upper end 60 of sleeve 62 includes a plurality of circumferentially spaced segments 64 separated from each other by circumferentially spaced axially extending slots 66. Each of segments 64 includes a lower base end 68 joining an intermediate portion 70 sleeve 62 and a longitudinally extending prong 72 extending axially upward from lower base end 68. For each segment 64, at upper end 60, each prong 72 joins a radially outward protrusion 74 that extends radially outward past an outer circumferential surface 72a of the respective prong 72, such that an outer circumferential surface 74a of each protrusion 74 is further radially from center axis CA than outer circumferential surface 72a. Radially outward protrusions 74 form a radially enlarged end portion 75 of sleeve 62.

Each of protrusions 74 is radially thicker than prongs 72 and intermediate portion 70. As shown in FIG. 3, an inner circumferential surface 74b of each protrusion 74 is substantially the same radial distance from center axis CA as an inner circumferential surface 72b of the respective prong 72. Protrusions 74 are supported by support section 44 of radially enlarged annular portion 40 of nozzle 24. More specifically, each of protrusions 74 includes a lower surface 74c that rests vertically on support surface 44a of support section 44. Each lower surface 74c includes a groove 76 formed therein that separates lower surface 74c into two contact portions 74d, 74e that are radially and axially offset from each other.

Slots 66 are each defined by a circumferentially extending base edge 78a, which is at a top of intermediate portion 70, and two axially extending longitudinal edges 78b, 78c, which extend axially upward from base edge 78a. A first longitudinal edge 78b extends axially upward from base edge 78a to a respective upper surface 74f of one of protrusions 74 and a second longitudinal edge 78c extends axially upward from base edge 78a to a respective upper surface 74f of another of protrusions 74. For each slot 66, each edge 78b forms the lateral edge of the prong 72 and protrusion 74 of one of segments 64 and each edge 78c forms the lateral edge of the prong 72 and protrusion 74 of another of segments 64. Edges 78b, 78c each extend radially from inner circumferential surface 72b to outer circumferential surface 72a of the respective prong 72 and from inner circumferential surface 74b to outer circumferential surface 74a of the respective protrusion 74.

Thermal sleeve 62 is configured such that upper end 60 is configured as a radially variable end whose radius be varied. More specifically, upper end 60 is radially expandable and radially compressible between a radially contracted configuration, in which upper end 60 has a smaller outer diameter, and a radially expanded configuration, in which upper end 60 has a larger outer diameter. More specifically, segments 64 are configured such that segments 64 are radially flexible. Segments 64 are forcible radially inward to orient upper end 60 in the radially contracted configuration and are forcible radially outward to orient upper end 60 in the radially expanded configuration. In one preferred embodiment, segments 64 are configured with a sufficient resiliency such that an externally applied radially inward force moves upper end 60 into the radially contracted configuration and the construction of segments 64 generates the radially outward force that is sufficient to move upper end 60 from the radially contracted configuration to the radially expanded configuration when the externally applied radially inward force is removed. In an alternative embodiment, segments 64 are configured with a sufficient resiliency such that an externally applied radially outward force moves upper end 60 into the radially expanded configuration and the construction of segments 64 generates the radially inward force that is sufficient to move upper end 60 from the radially contracted configuration to the radially expanded configuration when the externally applied radially inward force is removed. In another alternative embodiment, segments 64 are configured such that an externally applied radially inward force is required to move upper end 60 into the radially contracted configuration and an externally applied radially outward force is required to move upper end 60 into the radially expanded configuration.

In the embodiment shown in FIG. 3, a retainer 80 is mounted on upper end 60 of sleeve 62 to hold upper end 60 in the radially expanded configuration by limiting radial inward movement of protrusions 74. More specifically, retainer 80 is formed as a ring held in inner circumferential surfaces 74b of protrusions 74. Each protrusion 74 is provided with a respective slot 82 formed in the respective inner circumferential surface 74b. An outer circumferential surface 80a of retainer 80 forces radially outward against protrusions by contacting a radially outer surface 82a of each slot 82. An upper surface 80b of retainer 80 contacts an upper surface 82b of each slot 82 and a lower surface 80c of retainer 80 contacts a lower surface 82c of each slot 82 to hold retainer 80 axially in place on upper end 60. Lower surface 80c of retainer 80 is angled with respect to center axis CA at a non-perpendicular angle for ease of installation in slot 82. More specifically surface 80c has a frustoconical shape.

A method of replacing sleeve 26 with sleeve 62 in accordance with an embodiment of the present invention will now be described with respect to FIGS. 2a to 2c and FIG. 3. First, RVCH 14 is first removed from shell 16 and placed on a head stand to perform sleeve replacement so that it is easy to access the lower end 32. Next, sleeve 26 is removed from nozzle 24. In one preferred embodiment, radially enlarged portion 48 of sleeve 26 is broken apart such that sleeve 26 can be pulled downward through nozzle 24 out of lower end 32 from below the RVCH 14 while on the head stand. Sleeve 62 is configured to be inserted into nozzle 24 from lower end 32 while on the head stand. The method includes providing sleeve 62 into an interior of RVCH 14. Funnel 50 can be installed on a lower end of intermediate portion 70 in the same manner as shown in FIG. 2c before funnel 50 is provided into the interior of RVCH 14. Then, with upper end 60 in the radially contracted configuration, upper end 60 of sleeve 62 is inserted into lower end 32 of nozzle 24. Retainer 80 is not mounted onto upper end 60 when upper end 60 of sleeve 62 is inserted into lower end 32 of nozzle 24. A radially inward force can be applied to segments 64 to orient upper end 60 in the radially contracted configuration, such that an outermost diameter of upper end 60, as defined by a maximum distance between outer circumferential surfaces 74a of protrusions 74, is smaller than an inner diameter of nozzle 24 at lower edge 52b. Then, with upper end 60 in the radially contracted configuration, sleeve 62 is forced upward through an interior of nozzle 24 until upper end 60 reaches radially enlarged support section 44.

Next, after upper end 60 reaches radially enlarged support section 44, upper end 60 is radially expanded into the radially expanded orientation, such that outer circumferential surfaces 74a are positioned further radially away from center axis CA than inner circumferential surface 42a. Lower surfaces 74c of protrusions 74 enter into contact with support surface 44a to retain sleeve 62 in place in nozzle 24.

Lower surfaces 74c of protrusions 74 axially abut support surface 44a such that sleeve 62 cannot be pulled downward when upper end 60 is in the radially expanded configuration. Next, retainer 80 is mounted onto upper end 60 to prevent upper end 60 from being moved out of the radially expanded configuration. Protrusions 74 are moved radially outward for the installation of retainer 80 in slot 82. Retainer 80 may be forced downward into upper surface 74f such that surface 80b contacts a frustoconical portion 74g of upper surface 74f and a downward force applied by retainer 80 to surface 74f forces or helps force protrusions 74 radially outward so retainer 80 can be snapped into slot 82. Once retainer 80 is in slot 82, protrusions 74 cannot be contracted radially inward into the radially contracted configuration and upper end 60 of sleeve 62 is locked in the upper end 28 of nozzle 24.

For example, in one embodiment, a tool can compress segments 64 radially inward, while the tool holds the retainer 80 above the segments 64. The tool can be introduced through the lower end 32. In the next step, when segments 64 are above the support surface 44a, the tool releases the radially inward compression, allowing the segments 64 to expand radially outward into an expanded position. In the next step, when removing the tool through a downward axial motion, the segments 64 are expanded radially outward, to allow the retainer 80 to take the position radially inward of and in front of the slots 82. In a final step of removing the tool, the segments 64 take their final radially uncompressed position, locking the retainer 80 into the slots 82. Optionally, the tool can have welding means to weld the retainer in position into the slot 82.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method for replacing a sleeve lining a tube passing through a nuclear reactor pressure vessel, the sleeve having an end including a radially enlarged end portion configured for resting on a support section of the tube for retaining the sleeve in the tube, the method comprising:
    removing the sleeve from the tube;
    providing a new sleeve with a radially variable end configured for being moved between a radially contracted configuration and a radially expanded configuration; and
    installing the new sleeve in the tube such that the radially variable end is received by the support section and the radially variable end retains the new sleeve in the tube, the radially variable end being in the radially contracted configuration during installation and being in the radially expanded configuration after the new sleeve is installed in the tube,
    the installing of the new sleeve in the tube including, after the radially variable end is received by the support section, mounting a retainer on the radially variable end to restrain the radially variable end in the radially expanded configuration.

2. The method as recited in claim 1 wherein the installing of the new sleeve includes inserting the radially variable end in the radially contracted configuration in a first end of the tube, the radially variable end being in the radially expanded configuration in a second end of the tube after installation.

3. The method as recited in claim 2 wherein the first end of the tube is a lower end of the tube and the second end of the tube is an upper end of the tube.

4. The method as recited in claim 1 wherein the radially variable end includes a plurality of circumferentially spaced segments that are flexible radially inward and radially outward.

5. The method as recited in claim 4 wherein each of the circumferentially spaced segments includes a radially outward protrusion resting on the support section after the new sleeve is installed in the tube.

6. The method as recited in claim 5 wherein the new sleeve includes a first end, a second end and an intermediate portion extending from the first end to the second end, the first end being the radially variable end, the radially outward protrusions extending radially outward past an outer circumferential surface of the intermediate portion.

7. The method as recited in claim 6 wherein each of the segments includes a base end at the intermediate portion and a longitudinally extending prong extending axially from the base end to the radially outward protrusion.

8. The method as recited in claim 1 wherein the new sleeve includes a funnel at an end thereof that is opposite of the radially variable end, the funnel being part of the new sleeve during the installing of the new sleeve in the tube.

9. The method as recited in claim 1 wherein the tube is passing through a closure head of the nuclear reactor pressure vessel, the closure head being separated from a cylindrical shell of the nuclear reactor pressure vessel during the installing of the new sleeve in the tube.

10. The method as recited in claim 9 wherein the tube is a control rod drive mechanism nozzle and the new sleeve is a thermal sleeve.

11. The method as recited in claim 1 wherein the radially variable end includes a plurality of circumferentially spaced segments that are flexible radially inward and radially outward, each of the circumferentially spaced segments including a longitudinally extending prong and a radially outward protrusion on an upper end of the prong, each radially outward protrusion extending radially outward past an outer circumferential surface of the respective prong.

12. The method as recited in claim 11 wherein the installing of the new sleeve includes forcing the radially outward protrusions radially inward to orient the radially variable end in the radially contracted configuration and inserting the radially variable end in a lower end of the tube while the radially variable end is in the radially contracted configuration.

13. The method as recited in claim 12 wherein the installing of the new sleeve further includes moving the radially variable end upward through an intermediate portion of the tube while the radially variable end is in the radially contracted configuration until the radially variable end reaches the support section, the support section having a larger diameter than the intermediate portion of the tube, the protrusions expanding radially outward when the radially variable end reaches the support section to orient the radially variable end in the radially expanded configuration.

14. A control rod drive mechanism thermal sleeve for insertion into a control rod drive mechanism nozzle of a nuclear reactor pressure vessel, the control rod drive mechanism thermal sleeve being a new sleeve comprising:
    a radially variable end configured for being moved between a radially contracted configuration and a radially expanded configuration, the radially variable end configured for retaining the new sleeve in the nozzle in the radially expanded configuration;

a further end opposite of the radially variable end, the further end including a funnel having a frustoconical portion having a maximum diameter edge defining an end edge of the further end; and a retainer mounted on the radially variable end to restrain the radially variable end in the radially expanded configuration.

15. The control rod drive mechanism thermal sleeve as recited in claim 14 wherein the radially variable end includes a plurality of circumferentially spaced segments that are flexible radially inward and radially outward.

16. The control rod drive mechanism thermal sleeve as recited in claim 15 wherein each of the circumferentially spaced segments includes a radially outward protrusion configured for retaining the control rod drive mechanism thermal sleeve in the control rod drive mechanism nozzle.

17. The control rod drive mechanism thermal sleeve as recited in claim 16 further comprising an intermediate portion extending from the radially variable end to the further end, the radially outward protrusions extending radially outward past an outer circumferential surface of the intermediate portion.

18. The control rod drive mechanism thermal sleeve as recited in claim 17 wherein each of the segments includes a base end at the intermediate portion and a longitudinally extending prong extending axially from the base end to the radially outward protrusion.

* * * * *